Figure 1:
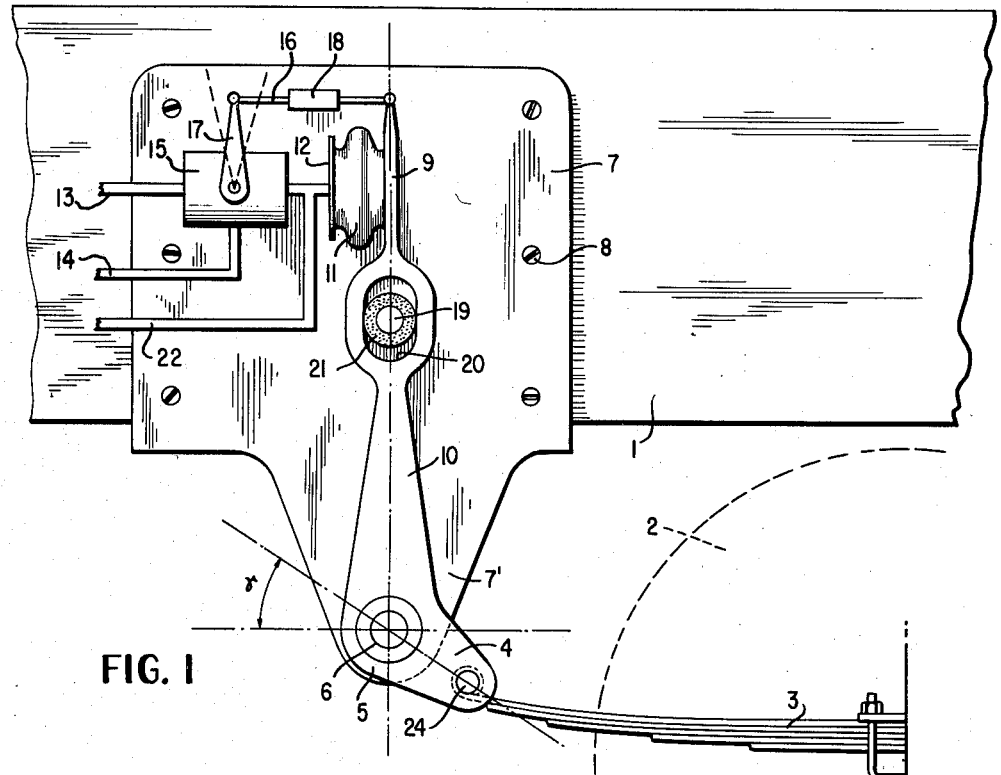

June 21, 1966     P. E. STRIFLER     3,257,153
BRAKE CONTROL SYSTEM RESPONSIVE TO WEIGHT Filed May 2, 1962

INVENTOR.
PAUL E. STRIFLER

BY *Dicke + Craig*

ATTORNEYS.

_United States Patent Office_ 3,257,153
Patented June 21, 1966

3,257,153
BRAKE CONTROL SYSTEM RESPONSIVE TO WEIGHT
Paul E. Strifler, Kornwestheim, Kreis Ludwigsburg, Germany, assignor to Daimler-Benz Aktiengesellschaft, Stuttgart-Unterturkheim, Germany
Filed May 2, 1962, Ser. No. 191,855
Claims priority, application Germany, May 3, 1961,
D 35,976
16 Claims. (Cl. 303—22)

The present invention relates to a control device, operable in dependence on the load, for the distribution of the brake force to the different wheels or axles of a vehicle, especially of a motor vehicle.

It is known in the prior art to selectively change with trucks, and especially with semi-trailers, the brake force distribution as a function of the rear axle pressure. The flexing or bending of the rear axle spring is thereby utilized in the prior art as indicating means for such change. This, however, entails the disadvantage that the brake force distribution is dependent on the spring tolerances and that additionally, with leaf springs, a change in the characteristics of the spring by settling of the spring, by the installation of new leaves in case of repairs, etc., cannot be taken into consideration.

The present invention aims at avoiding these disadvantages and at providing a control system which is influenced directly by the wheel load or axle load. Therebeyond, the present invention aims at permitting only the static load of the wheels or axles to become effective and to eliminate the dynamic forces which occur during drive.

The present invention essentially consists in constituting the abutment for the springs associated with the wheel or axle suspension by one arm of a double-armed lever rotatably supported at the vehicle superstructure of the vehicle, the second arm of which rests against a folding bellows filled with a pressure medium so that a pressure is produced within the bellows dependent on the load which may be utilized, in a manner known per se, for actuating a brake-force distributing-valve.

According to a further feature of the present invention, the bellows may be operatively connected with a pressure medium source and a control valve may be provided which controls the supply or discharge of the pressure medium to and from the bellows, respectively, in such a manner that the double-armed lever always assumes a center position. The control valve may thereby be operatively connected with the double-armed lever by appropriate connecting means such as linkage, connecting rods, transmissions and the like and, upon deviation of the lever from the center position thereof, may be opened in order to enable the supply or discharge of the pressure medium to and from the bellows, respectively. The angle of rotation of the double-armed lever is limited appropriately by abutments, preferably elastic abutments.

For purposes of eliminating the influence of the dynamic forces, the lever arm serving as abutment for the springs may be inclined with respect to the horizontal about an angle the tangent of which is equal to the constant ratio of the dynamic vertically directed supplemental force occurring during the drive with respect to the horizontal propelling force or brake force. The lever arm serving as abutment for the spring furthermore may be constructed considerably shorter than the arm of the double-armed lever resting at the spring bellows.

Accordingly, it is an object of the present invention to provide a control system for distributing the brake force in vehicles which effectively eliminates the disadvantages and shortcomings encountered with the prior art systems.

It is another object of the present invention to provide a control system dependent on the load of the vehicle for the brake force distribution in the vehicle which is controlled substantially only by the static vehicle load to the exclusion of the dynamic forces occurring during the drive.

Still a further object of the present invention resides in the provision of a load-responsive control system for the brake force distribution in vehicles which is simple in structure, effective in operation for its intended purposes, and which may be installed without difficulty.

Another object of the present invention resides in the provision of a load-responsive control system for the brake force distribution in motor vehicles which is independent of changes that may occur in the spring characteristics of the spring system or of the wheel suspension of the vehicle.

Figure 2:
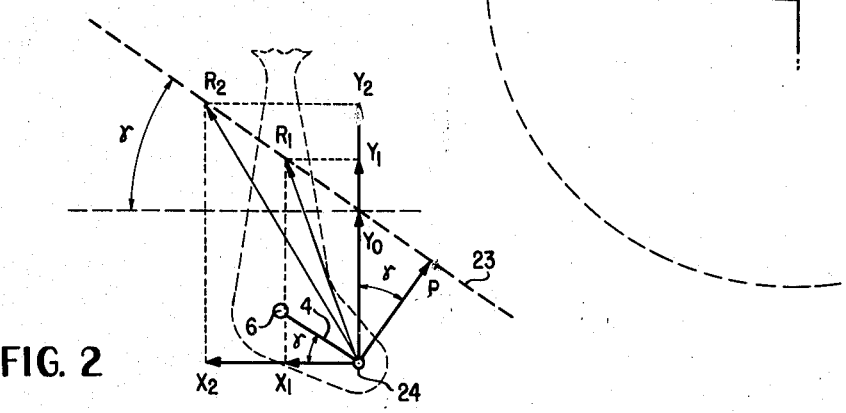

These and other objects, features and advantages of the present invention will become more obvious from the following description when taken in connection with the accompanying drawing which shows, for purposes of illustration only, one embodiment in accordance with the present invention, and wherein FIGURE 1 is a schematic view of a load responsive control system in accordance with the present invention, and FIGURE 2 is a vector diagram of the forces acting at the lever of the control system of FIGURE 1.

Referring now to the drawing wherein like reference numerals are used throughout the two views to designate corresponding parts, and more particularly to FIGURE 1, reference numeral 1 designates therein a bearer member of a motor vehicle. The bearer member 1 may be a separate frame member or may also be constituted by a supporting part formed by a self-supporting type body structure, the term "vehicle superstructure" being used herein to designate the vehicle part corresponding to member 1, i.e., that part which assumes the functions normally performed by a member of the vehicle frame or by supporting parts of a self-supporting type body construction. The wheel 2 is suitably supported at the vehicle superstructure 1 in the usual manner with the aid of a leaf spring 3 or the like. Whereas the opposite end of the leaf spring 3, i.e., the end not illustrated in the drawing, is directly secured by means of a shackle at the vehicle superstructure 1, the arm 4 of a double-armed lever 5 serves as abutment for the other end of the leaf spring 3, shown in the drawing. The double-armed lever 5 is rotatably supported in any suitable manner at 6 on an extension 7' of a supporting plate 7. The plate 7 is secured, for example, with the aid of screws 8 at the frame member or superstructure 1 of the vehicle.

The free end 9 of the second arm 10 of the double-armed lever 5 rests against a folding bellows 11 which is secured to the supporting plate 7 at 12. The bellows 11 is filled with a pressure medium, for example, compressed air which is supplied to the bellows 11 through line 13 and discharged therefrom through line 14. Intermediate the bellows 11, on the one hand, and the lines 13 and 14, on the other, is connected a control valve 15 of any suitable conventional construction by means of which the supply and discharge of the pressure medium to and from the bellows 11 is so controlled that the double-armed lever 5 always assumes the center position thereof. For that purpose, the arm 10 of the lever 5 is operatively connected with the control valve 15 through a rod 16 and a crank 17. The length of the rod 16 may be adjusted with the aid of an adjusting sleeve 18 in such a manner that the control valve 15 is closed when the arm 10 of the double-armed lever 5 assumes its center position. Upon deviation from this center position, the control valve 15 is opened in such a manner that either the pressure medium is permitted to flow into the bellows 11 through line 13 or is permitted to flow out of bellows 11 through line 14 so that the arm 10 again is returned to the center position thereof.

The angle of rotation of the double-armed lever 5 is limited by an abutment 19 which extends through an eye portion 20 provided in the lever arm 10 and which is surrounded with an elastic ring 21, for example, made of rubber, which in the center position of the lever arm 10 is still in slight contact with the oppositely disposed walls of the eye portion 20.

A line 22 is additionally connected with the spring bellows 11 through which the pressure produced within the bellows 11 is transmitted to a brake force distributing valve (not shown) of any known conventional construction. The brake force distributing valve (not shown) may be provided, for example, in the usual manner, with a piston which is displaced, against the force of a spring, by the pressure supplied through line 22. If the characteristics of the spring 3 are changed, for example, by the use of an additional auxiliary spring, then the counter spring force in the brake force distributing valve may also be changed with predetermined pressures.

In the embodiment illustrated in FIGURE 1, the reaction forces of the spring acting at the lever arm 4 of the double-armed lever 5 seek to rotate the double-armed lever 5 about the pivot point 6 thereof in the counterclockwise direction. The upper part 9 of the lever arm 10 thereby rests or abuts against the bellows 11 and produces therein a pressure which is proportional to the axle load. This pressure is transmitted through line 22 to the brake force distributing valve (not shown) and is utilized thereat for purposes of control of this valve. However, not only the force $Y_0$ illustrated in the diagram of FIGURE 2 which corresponds to the static axle load acts at the lever arm 4, but also, in case of the existence of horizontally directed propelling or driving forces $X_1$ or $X_2$, corresponding dynamic supplementary forces $Y_1$ or $Y_2$ which are vertically directed. The resulting forces acting on the lever arm 4 at point 24 during drive are indicated in the vector diagram of FIGURE 2 as $R_1$ and $R_2$. By reason of the constant ratio of the horizontally directed propelling or driving forces $X_1$ and $X_2$ to the corresponding vertically directed supplementary forces $Y_1$ and $Y_2$, the end points of the resultants $R_1$ and $R_2$ are disposed on a straight line 23 which also extends through the end point of the vector $Y_0$ corresponding to the static load. The straight line 23 forms an angle of inclination $\gamma$ with respect to the horizontal, the tangent of which is equal to the ratio of the vertical dynamic supplementary force $Y_1$ or $Y_2$ to the horizontal driving force $X_1$ or $X_2$. If now an inclination with respect to the horizontal equal to the angle $\gamma$ is also given to the lever arm 4 or to the straight line connecting the bearing points 6 and 24, then only the component P of the resulting forces $R_1$ and $R_2$ as well as of the static force $Y_0$ becomes effective for purposes of producing a torque. This torque and therewith also the load of the bellows 11, the pressure produced therein and the actuation of the brake force distributing valve are, therefore, completely independent of the propelling or driving force that occurs during drive of the vehicle and of the corresponding dynamic additional force so that with the use of the control system according to the present invention the brake force distribution may take place independently of the characteristics of the vehicle spring system as well as independently of the dynamic forces.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:
1. A load responsive control system for the brake force distribution by brake force distributing valve means to the different spring-supported wheels of a vehicle, especially of a motor vehicle, having a vehicle superstructure, comprising double-armed lever means rotatably supported at said vehicle superstructure, one of the arms of said double-armed lever means effectively constituting the spring abutment for the respective wheel, and bellows means filled with a pressure medium, the other arm of said lever means resting against said bellows means so that a pressure is produced therein which is dependent on the vehicle load and may be used for controlling the brake force distributing valve means and servo means for maintaining said lever in a fixed predetermined position.

2. A load responsive control system for the brake force distribution by a brake force distributing valve to the different spring-suspended wheels of a vehicle, especially of a motor vehicle, having a vehicle superstructure from which the wheels are spring-suspended, comprising double-armed lever means rotatably supported at said vehicle superstructure, one of the arms of said double-armed lever means effectively constituting a spring abutment for the spring means of the respective wheel, bellows means filled with a pressure medium, a source of pressure medium, and means operatively connecting said source with said bellows means including control valve means operable to selectively control the supply and discharge of the pressure medium to and from said bellows means, respectively, in such a manner that said double-armed lever means always assumes substantially the center position thereof, the other arm of said lever means resting against said bellows means so that the pressure produced therein is dependent on the vehicle load of the corresponding wheel and may be utilized for controlling the brake force distributing valve.

3. A load responsive control system for the brake force distribution by a brake-force distributing valve to the different spring-suspended wheels of a vehicle, especially of a motor vehicle, having a vehicle superstructure from which the wheels are spring-suspended, comprising doubled-armed lever means rotatably supported at said vehicle superstructure, one of the arms of said double-armed lever means effectively constituting a spring abutment for the spring means of the respective wheel, bellows means filled with a pressure medium, a source of pressure medium, first means operatively connecting said source with said bellows means, valve means in said first connecting means operable to selectively control the supply and discharge of the pressure medium to and from said bellows means, respectively, in such a manner that said lever means always assumes substantially the center position thereof, second means operatively connecting said valve means with said double-armed lever means to enable the selective supply and discharge of said pressure medium to and from said bellows means upon deflection of said lever means from said center position in one or the other direction, respectively, the other arm of said lever means resting against said bellows means so that the pressure produced therein is dependent on the vehicle load of the corresponding wheel and may be utilized for selectively controlling the brake force distributing valve.

4. A load responsive control system for the brake force distribution by a brake-force distributing valve to the different spring-suspended wheels of a vehicle, especially of a motor vehicle, having a vehicle superstructure from which the wheels are spring-suspended, comprising double-armed lever means rotatably supported at said vehicle superstructure, one of the arms of said double-armed lever means effectively constituting a spring abutment for the spring means of the respective wheel, bellows means filled with a pressure medium, a source of pressure medium, first means operatively connecting said source with said bellows means, valve means in said first connecting means operable to selectively control the supply and discharge of the pressure medium to and from said bellows means, respectively, in such a manner that said lever means always assumes substantially the center position thereof, second means operatively connecting said valve means with said double-armed lever means to enable the selective supply and discharge of said pressure medium to and from said bellows means upon deflection of said lever means from said center position in one or the other direction, respectively, the other arm of said lever means resting against said bellows means so that the pressure produced therein is dependent on the vehicle load of the corresponding wheel and may be utilized for selectively controlling the brake force distributing valve, and elastic abutment means for limiting the angular movements of said double-armed lever means.

5. A load responsive control system for the brake force distribution by a brake force distributing valve to the different spring-suspended wheels of a vehicle, especially of a motor vehicle, having a vehicle superstructure from which the wheels are spring-suspended, comprising double-armed lever means rotatably supported at said vehicle superstructure, one of the arms of said double-armed lever means effectively constituting a spring abutment for the spring means of the respective wheel, bellows means filled with a pressure medium, a source of pressure medium, first means operatively connecting said source with said bellows means, valve means in said first connecting means operable to selectively control the supply and discharge of the pressure medium to and from said bellows means, respectively, in such a manner that said lever means always assumes substantially the center position thereof, second means operatively connecting said valve means with said double armed lever means to enable the selective supply and discharge of said pressure medium to and from said bellows means upon deflection of said lever means from said center position in one or the other direction, respectively, the other arm of said lever means resting against said bellows means so that the pressure produced therein is dependent on the vehicle load of the corresponding wheel and may be utilized for selectively controlling the brake force distributing valve, and elastic abutment means for limiting the angular movements of said double-armed lever means, the said one arm of said lever means forming a predetermined angle with respect to the horizontal, the tangent of which is substantially equal to the constant ratio of the vertical supplemental force to the horizontal drive force which occur during the drive.

6. A load responsive control system for the brake force distribution by a brake force distributing valve to the different spring-suspended wheels of a vehicle, especially of a motor vehicle, having a vehicle superstructure from which the wheels are spring-suspended, comprising double-armed lever means rotatably supported at said vehicle superstructure, one of the arms of said double-armed lever means effectively constituting a spring abutment for the spring means of the respective wheel, bellows means filled with a pressure medium, a source of pressure medium, first means operatively connecting said source with said bellows means, valve means in said first connecting means operable to selectively control the supply and discharge of the pressure medium to and from said bellows means, respectively, in such a manner that said lever means always assumes substantially the center position thereof, second means operatively connecting said valve means with said double-armed lever means to enable the selective supply and discharge of said pressure medium to and from said bellows means upon deflection of said lever means from said center position in one or the other direction, respectively, the other arm of said lever means resting against said bellows means so that the pressure produced therein is dependent on the vehicle load of the corresponding wheel and may be utilized for selectively controlling the brake force distributing valve, said one arm being much shorter than said other arm of said double-armed lever means, and elastic abutment means for limiting the angular movements of said double-armed lever means, the said one arm of said lever means forming a predetermined angle with respect to the horizontal the tangent of which is substantially equal to the constant ratio of the vertical supplemental force to the horizontal drive force which occur during the drive.

7. In a brake-force distributing control system operable to distribute the brake force by brake-force distributing-valve means to the different axles or wheels of the vehicle, especially of a motor vehicle, having a vehicle superstructure, the improvement essentially consisting of double-armed lever means rotatably supported at said vehicle superstructure, one of the arms of said double-armed lever means effectively constituting the abutment for the springs of the respective axle, bellows means filled with a pressure medium, the other arm of said lever means resting against said bellows means so that the pressure produced therein is dependent on the vehicle load of the corresponding axle and may be utilized for controlling the brake force distributing valve and closed loop servo means for maintaining said lever in a fixed predetermined position.

8. A load responsive control system for the brake force distribution by a brake force distributing valve to the different spring-suspended wheels of a vehicle, especially of a motor vehicle, having a vehicle superstructure from which the wheels are spring-suspended, comprising double-armed lever means rotatably supported at said vehicle superstructure, one of the arms of said double-armed lever means effectively constituting a spring abutment for the spring means of the respective wheel, bellows means filled with a pressured medium, a source of pressure medium, first means operatively connecting said source with said bellows means, valve means in said first connecting means operable to selectively control the supply and discharge of the pressure medium to and from said bellows means, respectively, in such a manner that said lever means always assumes substantially the center position thereof, second means operatively connecting said valve means with said double armed lever means to enable the selective supply and discharge of said pressure medium to and from said bellows means upon deflection of said lever means from said center position in one or the other direction, respectively, the other arm of said lever means resting against said bellows means so that the pressure produced therein is dependent on the vehicle load of the corresponding wheel and may be utilized for selectively controlling the brake force distributing valve, the said one arm of said lever means forming a predetermined angle with respect to the horizontal, the tangent of which is substantially equal to the constant ratio of the vertical supplemental force to the horizontal drive force which occur during the drive.

9. A load responsive control system for the brake force distribution by a brake force distributing valve to the different spring-suspended wheels of a vehicle, especially of a motor vehicle, having a vehicle superstructure from which the wheels are spring-suspended, comprising double-armed lever means rotatably supported at said vehicle superstructure, one of the arms of said double-armed lever means effectively constituting a spring abutment for the spring means of the respective wheel, bellows means filled with a pressure medium, a source of pressure medium, first means operatively connecting said source with said bellows means, valve means in said first connecting means operable to selectively control the supply and discharge of the pressure medium to and from said bellows means, respectively, in such a manner that said lever means always assumes substantially the center position thereof, second means operatively connecting said valve means with said double-armed lever means to enable the selective supply and discharge of said pressure medium to and from said bellows means upon deflection of said lever means from said center position in one or the other direction, respectively, the other arm of said lever means resting against said bellows means so that the pressure produced therein is dependent on the vehicle load of the corresponding wheel and may be utilized for selectively controlling the brake force distributing valve, said one arm being much shorter than said other arm of said double-armed lever means, the said one arm of said lever means forming a predetermined angle with respect to the horizontal the tangent of which is substantially equal to the constant ratio of the vertical supplemental force to the horizontal drive force which occur during the drive.

10. In a brake-force distributing control system operable to distribute the brake force by brake-force distributing-valve means to the different axles or wheels of the vehicle, especially of a motor vehicle, having a vehicle superstructure, the improvement essentially consisting of double-armed lever means rotatably supported at said vehicle superstructure, one of the arms of said double-armed lever means effectively constituting the abutment for the springs of the respective axle, said one arm forming a predetermined angle with respect to the horizontal, the tangent of said angle being substantially equal to the constant ratio of the vertically directed supplemental forces which occur during the drive to the horizontally directed propelling forces, and bellows means filled with a pressure medium, the other arm of said lever means resting against said bellows means so that the pressure produced therein is in dependence on the vehicle load of the corresponding axle and may be utilized for controlling the brake force distributing valve.

11. In a brake-force distributing control system operable to distribute the brake force by brake-force distributing-valve means to the different axles or wheels of the vehicle, especially of a motor vehicle, having a vehicle superstructure, the improvement essentially consisting of double-armed lever means rotatably supported at said vehicle superstructure, one of the arms of said double-armed lever means effectively constituting the abutment for the springs of the respective axle, and bellows means filled with a pressure medium, the other arm of said lever means resting against said bellows means so that the pressure produced therein is in dependence on the vehicle load of the corresponding axle and may be utilized for controlling the brake force distributing valve, said one arm being much shorter than the other arm of said double-armed lever means and servo means for detecting movement of said lever means and for varying the amount of pressure medium in said bellows means in direct response thereto.

12. In a brake-force distributing control system operable to distribute the brake force by brake-force distributing-valve means to the different axles or wheels of the vehicle, especially of a motor vehicle, having a vehicle superstructure, the improvement essentially consisting of double-armed lever means rotatably supported at said vehicle superstructure, elastic abutment means for said lever means to limit the angular movements thereof, one of the arms of said double-armed lever means effectively constituting the abutment for the springs of the respective axle, and bellows means filled with a pressure medium, the other arm of said lever means resting against said bellows means so that the pressure produced therein is in dependence on the vehicle load of the corresponding axle and may be utilized for controlling the brake force distributing valve, the other arm of said lever means having servo means associated therewith for maintaining the position of said lever means at a predetermined angle.

13. In a brake-force distributing control system operable to distribute the brake force by brake-force distributing-valve means to the different axles or wheels of the vehicle, especially of a motor vehicle, having a vehicle superstructure, the improvement essentially consisting of double-armed lever means rotatably supported at said vehicle superstructure, elastic abutment means for said lever means to limit the angular movements thereof, one of the arms of said double-armed lever means effectively constituting the abutment for the springs of the respective axle, and bellows means filled with a pressure medium, the other arm of said lever means resting against said bellows means so that the pressure produced therein is in dependence on the vehicle load of the corresponding axle and may be utilized for controlling the brake force distributing valve, said one arm being much shorter than the other arm of said double-armed lever means and closed loop servo means for maintaining said lever means in a fixed predetermined position.

14. In a brake-force distributing control system operable to distribute the brake force by brake-force distributing-valve means to the different axles or wheels of the vehicle, especially of a motor vehicle, having a vehicle superstructure, the improvement essentially consisting of double-armed lever means rotatably supported at said vehicle superstructure, elastic abutment means for said lever means to limit the angular movements thereof, one of the arms of said double-armed lever means effectively constituting the abutment for the springs of the respective axle, said one arm forming a predetermined angle with respect to the horizontal, the tangent of said angle being substantially equal to the constant ratio of the vertically direced supplemenal forces which occur during the drive to the horizontally directed propelling forces, and bellows means filled with a pressure medium, the other arm of said lever means resting against said bellows means so that the pressure produced therein is in dependence on the vehicle load of the corresponding axle and may be utilized for controlling the brake force distributing valve, said one arm being much shorter than the other arm of said double-armed lever means.

15. In a brake-force distributing control system operable to distribute the brake force by brake-force distributing-valve means to the different axles or wheels of the vehicle, especially of a motor vehicle, having a vehicle superstructure, the improvement essentially consisting of double-armed lever means rotatably supported at said vehicle superstructure, elastic abutment means for said lever means to limit the angular movements thereof, one of the arms of said double-armed lever means effectively constituting the abutment for the springs of the respective axle, said one arm forming a predetermined angle with respect to the horizontal, the tangent of said angle being substantially equal to the constant ratio of the vertically directed supplemental forces which occur during the drive to the horizontally directed propelling forces, and bellows means filled with a pressure medium, the other arm of said lever means resting against said bellows means so that the pressure produced therein is in dependence on the vehicle load of the corresponding axle and may be utilized for controlling the brake force distributing valve, said one arm being much shorter than the other arm of said double-armed lever means, and closed loop servo means associated with said bellows means for adjusting the pressure in said bellows means in direct response to the movement of said lever means so as to maintain said lever means at said predetermined angle.

16. In a brake-force distributing control system operable to distribute the brake force by brake-force distributing-valve means to the different axles or wheels of the vehicle, especially of a motor vehicle, having a vehicle superstructure, one of the arms of said double-armed lever means effectively constituting the abutment for the springs of the respective axle, said one arm forming a predetermined angle with respect to the horizontal, the tangent of said angle being substantially equal to the constant ratio of the vertically directed supplemental forces which occur during the drive to the horizontally directed propelling forces, and bellows means filled with a pressure medium, the other arm of said lever means resting against said bellows means so that the pressure produced therein is in dependence on the vehicle load of the corresponding axle and may be utilized for controlling the brake force distributing valve, and means for controlling the pressure in said bellows means so as to maintain said lever means at said predetermined angle.

References Cited by the Examiner

UNITED STATES PATENTS 2,179,399  11/1939  Browall _____ 303—22 X

EUGENE G. BOTZ, *Primary Examiner.*